(12) United States Patent
Taylor (10) Patent No.: US 9,714,044 B2
(45) Date of Patent: Jul. 25, 2017

(54) SKATEBOARD CARRIER BAG

(71) Applicant: Chanse Taylor, Las Vegas, NV (US)

(72) Inventor: Chanse Taylor, Las Vegas, NV (US)

( * ) Notice: Subject to any disclaimer, the term of this patent is extended or adjusted under 35 U.S.C. 154(b) by 15 days.

(21) Appl. No.: 14/803,832

(22) Filed: Jul. 20, 2015

(65) Prior Publication Data

US 2015/0321686 A1    Nov. 12, 2015

Related U.S. Application Data

(63) Continuation-in-part of application No. 13/791,541, filed on Mar. 8, 2013, now Pat. No. 9,089,199.

(51) Int. Cl.

| | |
|---|---|
| *B62B 1/26* | (2006.01) |
| *B62B 1/14* | (2006.01) |
| *B62B 5/06* | (2006.01) |
| *A45F 3/04* | (2006.01) |
| *A45C 5/14* | (2006.01) |
| *A63C 17/01* | (2006.01) |
| *A63C 17/00* | (2006.01) |
| *A45F 3/00* | (2006.01) |

(52) U.S. Cl.
CPC ............... *B62B 1/26* (2013.01); *A45C 5/14* (2013.01); *A45F 3/04* (2013.01); *A63C 17/002* (2013.01); *A63C 17/0013* (2013.01); *A63C 17/01* (2013.01); *B62B 1/14* (2013.01); *B62B 5/06* (2013.01); *A45F 2003/003* (2013.01); *A63C 2203/44* (2013.01)

(58) Field of Classification Search
CPC ... A63C 17/0013; A63C 17/01; A63C 17/002; B62B 1/26; B62B 1/266; A45C 5/06; A45C 2200/10

USPC ................... 224/645, 647, 652-3
See application file for complete search history.

(56) References Cited

U.S. PATENT DOCUMENTS

| | | | | |
|---|---|---|---|---|
| 5,092,506 | A * | 3/1992 | Bolduc | A45F 3/04 224/191 |
| D382,110 | S * | 8/1997 | Pollari | D3/217 |
| 6,279,796 | B1 * | 8/2001 | Trevino | A45C 13/002 150/154 |
| D461,052 | S * | 8/2002 | Vazquez | D3/289 |
| 6,585,137 | B1 * | 7/2003 | Archuleta | A45C 3/00 224/576 |
| 6,786,375 | B2 * | 9/2004 | Worden | A45C 3/12 206/315.1 |
| D524,539 | S * | 7/2006 | Metzger | D3/254 |
| 7,226,085 | B2 * | 6/2007 | Baker | A63C 17/002 280/608 |
| 7,322,477 | B2 * | 1/2008 | Schweitz | A45C 7/009 150/111 |
| 7,757,911 | B2 * | 7/2010 | Barker | A45C 3/14 224/153 |
| D695,006 | S * | 12/2013 | Taylor | D3/216 |
| 9,089,199 | B1 * | 7/2015 | Taylor | A45C 13/02 |
| 9,095,766 | B1 * | 8/2015 | Christie | A63C 17/01 |

(Continued)

*Primary Examiner* — Brian D Nash
(74) *Attorney, Agent, or Firm* — Lightbulb IP, LLC (57) ABSTRACT

A skateboard carrier bag with a skateboard compartment conveniently holds a skateboard freeing the user's hands for other tasks. The skateboard compartment will typically conform to the shape of a skateboard inserted therein, reducing overall size and bulk, and allowing the skateboard carrier bag to be easily transported. In this manner, a user may take his or her skateboard virtually anywhere.

20 Claims, 5 Drawing Sheets

(56) References Cited

U.S. PATENT DOCUMENTS

| | | | | |
|---|---|---|---|---|
| 9,415,294 B2* | 8/2016 | Pino | ................... | A63C 17/002 |
| 2003/0146120 A1* | 8/2003 | Chi | ..................... | A45C 5/06 |
| | | | | 206/315.5 |
| 2004/0238585 A1* | 12/2004 | Scarano | ................. | A45F 3/02 |
| | | | | 224/613 |
| 2012/0292353 A1* | 11/2012 | Andersen | ............... | A45F 3/06 |
| | | | | 224/149 |
| 2015/0108194 A1* | 4/2015 | Pino | ................... | A63C 17/002 |
| | | | | 224/653 |

* cited by examiner

SKATEBOARD CARRIER BAG

CROSS-REFERENCE TO RELATED APPLICATION

This application is a continuation-in-part of U.S. patent application Ser. No. 13/791,541, filed Mar. 8, 2013.

BACKGROUND OF THE INVENTION

Field of the Invention

The invention relates to bags and carriers, and in particular to a bag with one or more skateboard compartments.

Related Art

Skateboarding is a popular activity enjoyed by many. Today, there are numerous parks, venues, and events specifically designated for skateboarding. In addition, skaters can skateboard at various other urban and other environments. Also, the skateboard is a popular means of transportation for younger people.

At times however, riding a skateboard is either not permitted or not advisable. For example, a skater may not be allowed to skate by virtue of laws or other regulations, or the skater may be in a crowded area where skating might be difficult or dangerous to others. In such cases, skaters often carry their skateboards manually from one place to another. A skateboard may be transported in a bag or other carrier as well. However, such carriers are not configured to carry a skateboard efficiently.

From the discussion that follows, it will become apparent that the present invention addresses the deficiencies associated with the prior art while providing numerous additional advantages and benefits not contemplated or possible with prior art constructions.

SUMMARY OF THE INVENTION

A skateboard carrier bag is disclosed herein. The skateboard carrier bag's formfitting compartment allows a skateboard to be carried therein while keeping the overall size and bulk of the backpack to a minimum. This allows a skateboard to be conveniently carried virtually anywhere thus allowing the skateboard to be used as a form of transportation as well as for leisure or entertainment purposes.

Various embodiments of the skateboard carrier bag and methods therefor are disclosed herein. For instance, in one exemplary embodiment a skateboard carrier bag may comprise, an accessory compartment, a formfitting compartment attached to the accessory compartment and comprising a planar back section and one or more reinforced pouches, a base, and one or more wheels attached to the base. The accessory compartment may be rigid.

One or more additional accessory compartments may be included as well. In addition, one or more additional accessory compartments may be removably attached to the formfitting compartment by one or more connecting cords.

It is noted that the accessory compartment may comprise a removable or rotatable cover. Also, the formfitting compartment may comprise one or more fasteners to secure a skateboard therein. A pull handle attached to the accessory compartment may be provided as well.

In another exemplary embodiment, a skateboard carrier is disclosed, comprising a base portion having one or more wheels, an accessory compartment supported by the base portion, a formfitting compartment attached to the accessory compartment, and one or more openings in the formfitting compartment to receive a skateboard. The formfitting compartment comprises one or more pouches.

The pouches may be reinforced. In addition, an additional accessory compartment may be at the base portion. An additional accessory compartment may be removably attached to the formfitting compartment by one or more connecting cords. One or more fasteners may be at the openings of the formfitting compartment. Also, the accessory compartment may be rigid, comprises a removable or rotatable cover or both.

Various methods are disclosed herein as well. For instance, in one exemplary embodiment, a method for carrying a skateboard with a skateboard carrier bag is disclosed, with such method comprising opening a formfitting compartment of the skateboard carrier bag, placing the skateboard into the formfitting compartment, and rolling the skateboard carrier bag on one or more wheels secured at a base of the skateboard carrier bag. One or more wheels of the skateboard are received in one or more pouches of the formfitting compartment when the skateboard is in the formfitting compartment. Also, the formfitting compartment is attached to an accessory compartment of the skateboard carrier bag. The pouches may be reinforced.

The formfitting compartment may be closed and secured such that it remains closed with one or more fasteners. One or more additional accessory compartments may be attached to the formfitting compartment with one or more connecting cords. In addition, one or more items may be stored in the accessory compartment. Also, similar to above, the accessory compartment may be rigid.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The skateboard carrier bag herein (also described to as a "skateboard backpack" herein) is generally configured to receive a skateboard for storage and transport. Unlike traditional skateboard transport methods or apparatus (such as bags or carriers), the skateboard backpack can be worn while skating. As will be described further below, the formfitting compartment of the skateboard backpack reduces the skateboard backpack's size and bulkiness, thus allowing it to be worn without inhibiting skating.

In addition, the skateboard backpack frees its user's hands to carry or manipulate other items. Also, items besides a skateboard may be stored in various other compartments of the skateboard backpack. This allows the skateboard backpack to be used as a knapsack if desired. A student for example, may carry his or her skateboard along with a laptop, one or more books, other study materials, and/or food in the skateboard backpack.

Figure 1:
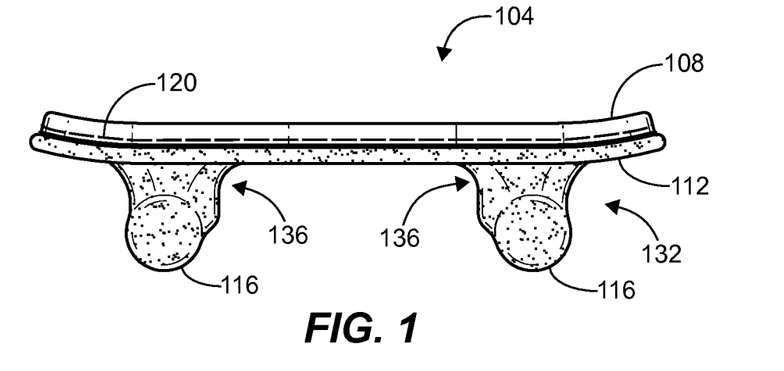
FIG. 1 is a side view of an exemplary skateboard carrier bag with formfitting skateboard compartment.

The skateboard backpack will now be described with regard to FIG. 1, which illustrates a side view of an exemplary skateboard backpack 104. As can be seen, the skateboard backpack 104 may comprise a front section 112 and a back section 108. When worn, the back section 108 will typically be positioned adjacent a user's back with the shoulder straps 128 of the skateboard backpack 104 over the user's shoulders. This secures the skateboard backpack 104 to the user. A carrying handle 124 may be provided in some embodiments to facilitate lifting or hanging of the skateboard backpack 104.

The back section 108 may be configured to support various components of the skateboard backpack 104. For example, the back section 108 may comprise a planar structure that generally defines the skateboard backpack's overall shape. The back section 108 may be a rigid material in one or more embodiments. Typically however, the back section 108 will be a flexible or semi-rigid material that allows for some flexibility while providing a structure to which various components of the skateboard backpack 104 may be attached. It is contemplated that the back section 108 may be padded or comprise one or more sections of padded material.

As can be seen, the front section 112 of the skateboard backpack 104 is configured to accept a skateboard therein. As can be seen, the front section 112 may conform to the general shape of a skateboard. For instance, the front section 112 of FIG. 1 comprises protruding sections or pouches 116 configured to accept the trucks and wheels of a skateboard. In addition, the front section 112 may be formed from a stretchable or resilient material/fabric, such as spandex or the like to create a formfitting compartment 132 around the skateboard. As can be seen from FIG. 1, the resilient fabric causes the front section 112 to squeeze around the deck and wheels of the skateboard, and tapering inward around the trucks of the skateboard.

The back section 108, though flexible, will typically not be stretchable as compared to the front section 112. This allows the back section 108 to provide a structure or shape to the skateboard backpack 104 as discussed above. As such, the back section 108 may be formed from fabrics such as nylon, Kevlar™ or other non-stretchable fabric. The shoulder straps 128 and other straps of the skateboard backpack will typically not be stretchable as well, though they may be lengthened or shortened using adjustment buckles or the like.

It is contemplated that various portions of the front section 112 may be reinforced to generate the formfitting compartment 132 around the skateboard. For example, thicker or additional layers of resilient fabric may be used to reduce the amount of stretching at particular areas of the front section 112. To illustrate, the resilient fabric may be thicker or have one or more additional layers (or otherwise reinforced) at the trucks 136 of the skateboard so as to taper inward at that location thus providing a formfitting compartment 132 around the trucks. Reinforcement may also be accomplished by attaching or using resilient fabric of different thicknesses and stretchability at areas where reinforcement is desired.

Reinforcement may be removable in some embodiments. For example, the skateboard backpack 104 may include one or more stretchable bands that can be placed around the pouches 116 to further secure the resilient material around the trucks and/or wheels of a skateboard. It is noted that reinforcement may also be used to strengthen the resilient material, increase its durability, or both.

The formfitting compartment 132 greatly reduces the size and bulkiness of the skateboard backpack 104, thus allowing it to be easily worn during skating, if so desired. This reduced size and bulkiness prevents the skateboard backpack 104 from inhibiting a user's movements while skating. This is highly advantageous in that other items in the skateboard backpack 104 can be carried by the user while the user is skating. When the user has finished skating or has skated to his or her destination, the skateboard can then be stored and transported in the skateboard backpack 104 as well. Once the skateboard is in the skateboard backpack 104, the users hands are free to carry or manipulate other items.

As will be described further below, a zipper 120 or other fastener may be used to allow a skateboard to be inserted into the skateboard backpack 104. In one or more embodiments, the zipper 120 may extend along the periphery of the skateboard backpack 104 to open and close the formfitting compartment 132 allowing a skateboard to be inserted into the skateboard backpack 104.

Figure 2:
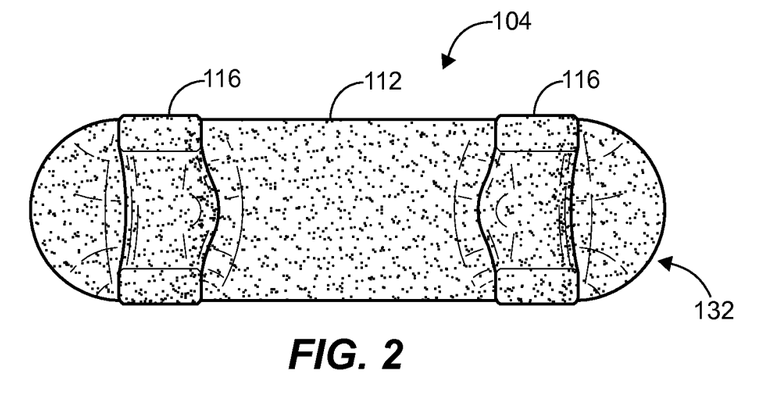
FIG. 2 is a front view of an exemplary skateboard carrier bag with formfitting skateboard compartment.

FIG. 2 illustrates a front view of an exemplary skateboard backpack 104. As can be seen, the wheels and trucks of a skateboard may be received in the pouches 116 of the front section 112. The resilient material forming the front section 112 collapses or squeezes inward around the skateboard, thus creating a formfitting compartment 132 around the skateboard. It is contemplated that each pouch 116 may receive one or more wheels and thus there may be one or more pouches in various embodiments of the skateboard backpack 104.

Figure 3:
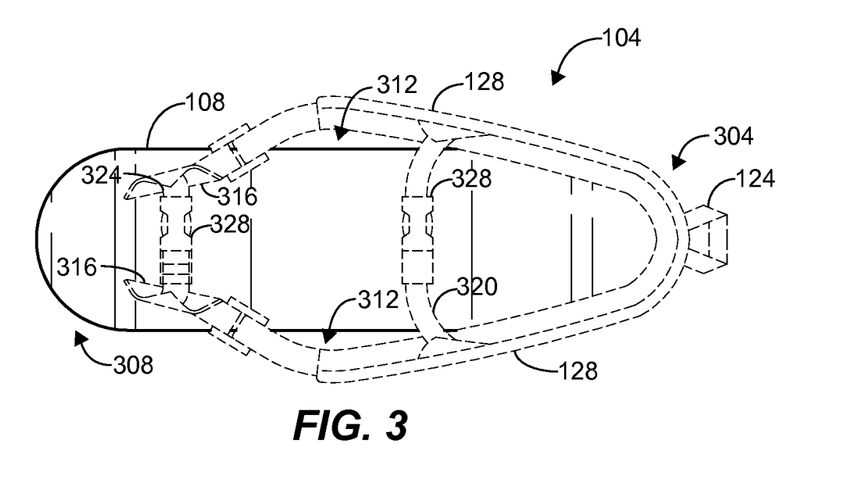
FIG. 3 is a back view of an exemplary skateboard carrier bag with formfitting skateboard compartment.

FIG. 3 illustrates a back view of an exemplary skateboard backpack 104. As can be seen, the back section 108 of the skateboard backpack 104 may comprise one or more shoulder straps 128. The shoulder straps 128 may be attached to the back section 108. For instance, as shown in FIG. 3, the shoulder straps are attached at a top end 304 and bottom end 308 of the back section 108. This creates openings 312 where a user may insert his or her arms and shoulders when the skateboard backpack 104 is worn. It is contemplated that the shoulder straps 128 may be sewn, adhered, or otherwise attached to the back section 108. In one or more embodiments, the back section 108 may have one or more mounts 316, such as in the form of nylon or other fabric, used to connect the shoulder straps 128 to the back section 108. It is noted that the shoulder straps 128 may have one or more buckles and/or be lengthened or shortened so as to fit users of various shapes and sizes.

It is contemplated that additional straps may be provided as well; such as to help ensure the skateboard backpack 104 is secured to its user. As shown in FIG. 3 for example, the skateboard backpack 104 may include a chest strap 320, waist strap 324, or both. These straps may include a buckle 328 or other coupling to allow the straps to be connected and disconnected and/or lengthened or shortened. This is advantageous in that it allows the user to skate without being bothered by swinging or other motion of the skateboard backpack.

Figure 4:
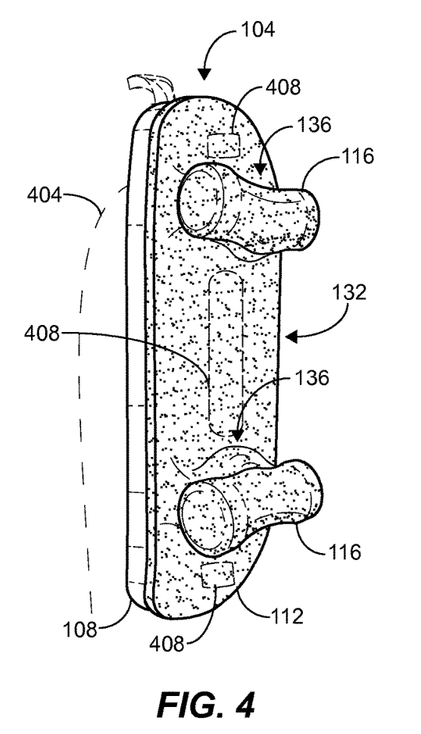
FIG. 4 is a front perspective view of an exemplary skateboard carrier bag with formfitting skateboard compartment in a closed configuration.
Figure 5:
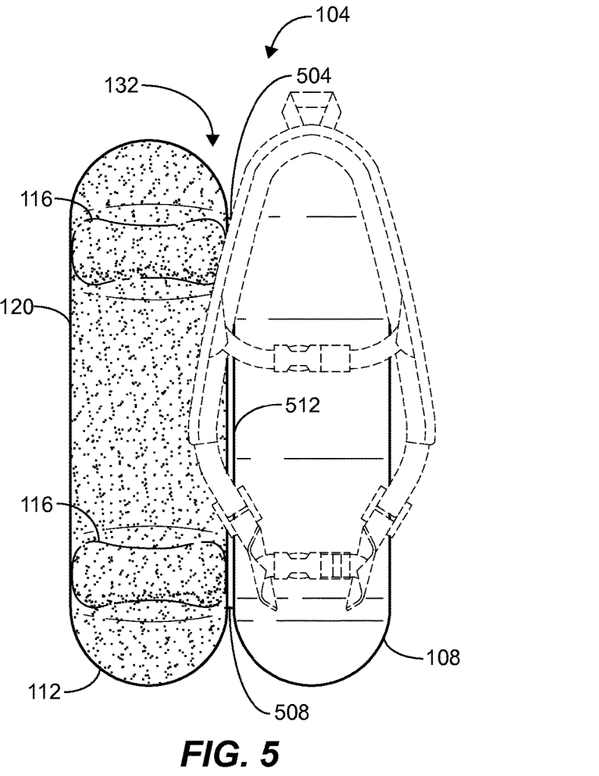
FIG. 5 is a plan view of an exemplary skateboard carrier bag with formfitting skateboard compartment in an open configuration.

Operation of the skateboard backpack 104 will now be described with regard to FIGS. 4 and 5. FIG. 4 illustrates a perspective view of an exemplary skateboard backpack 104 in a closed configuration and worn on a user's back 404, while FIG. 5 illustrates a back view of an exemplary skateboard backpack 104 in an open configuration. As stated above, the skateboard backpack 104 may be opened to remove or insert a skateboard, and closed to enclose the skateboard within a formfitting compartment 132 of the skateboard backpack.

Referring to FIG. 4, it can be seen that the skateboard backpack 104 may be worn by placing the shoulder straps 128 on the user's shoulders. This holds the skateboard backpack 104 in position at the user's back 404. In the closed configuration of FIG. 4, it can be seen that the skateboard is secured in the formfitting compartment 132 of the skateboard backpack 104.

Referring to FIG. 5, it can be seen that the skateboard backpack 104 may be opened to remove or insert a skateboard. FIG. 5 provides an interior view of an exemplary formfitting compartment 132 formed by the front section 112 and the back section 108. In this view the pouches 116 of the front section 112 can be seen as providing compartments to accept the wheels and trucks of a skateboard.

As stated above, a zipper 120 or other fastener may be used to secure the formfitting compartment 132 in a closed configuration, while allowing the skateboard backpack to be opened when so desired. As can be seen, the zipper 120 may extend along the periphery of the skateboard backpack 104. In the embodiment of FIG. 5, the zipper 120 extends from a first anchor point 504 to a second anchor point 508. Though shown at a particular location, it is contemplated that the first anchor point 504 and second anchor point 508 may be at various locations to adjust the extent to which the formfitting compartment 132 may open.

It is noted that one or more interior surfaces of the formfitting compartment 132 may have one or more liners, such as to protect the formfitting compartment 132 from wear and/or to cushion or protect a skateboard in the formfitting compartment. Alternatively or in addition, the formfitting compartment 132 may be reinforced (such as described above) at the ends, sides, or other areas where the edges of a skateboard come into contact with the formfitting compartment. It is contemplated that one or more liners may also be used to provide a lower friction surface to allow the skateboard to be more easily removed from or inserted into the formfitting compartment 132.

In use, the zipper 120 or other fastener may be unfastened (i.e., unzipped) to provide access to the interior of the formfitting compartment 132. A skateboard may be subsequently removed or inserted. When inserted, the pouches 116 will automatically conform to and squeeze around the trucks and wheels of the skateboard. This helps to ensure the skateboard is secured. The zipper 120 or other fastener may then be closed. The skateboard can be removed by opening the zipper 120 or other fastener and pulling the skateboard out of the formfitting compartment 132. Since the resilient material of the formfitting compartment is elastic/stretchable the skateboard can be conveniently removed as well.

Again, the skateboard backpack 104 is designed to allow a user to carry his or her items while the user is skating and thus the skateboard backpack can be used to carry items in virtually any circumstance (e.g., when the user is walking/running and when the user is skating). The experience of skating is uninhibited while wearing the skateboard backpack 104, and the user can easily and conveniently carried his or her skateboard in the skateboard backpack when not skating. When carried in the skateboard backpack 104, the user's hands remain free for carrying or manipulating other items since the user does not have to hand carry the skateboard.

As disclosed above, the skateboard backpack 104 may have various other compartments, carriers, pouches, and the like to carry other items besides the user's skateboard. For example, the shoulder straps 128 or other straps of the skateboard backpack 104 may have compartments to carry various items (typically of small size). As another example, the back section 108 of the skateboard backpack 104 may have one or more separate compartments for carrying items other than a skateboard. The skateboard backpack's compartments may have one or more openings for acceptance and removal of items and/or to allow items to extend into or out of such compartments. For example, a compartment may comprise an opening for headphone or other cables to extend out of the skateboard backpack 104 in one or more embodiments.

Figure 6:
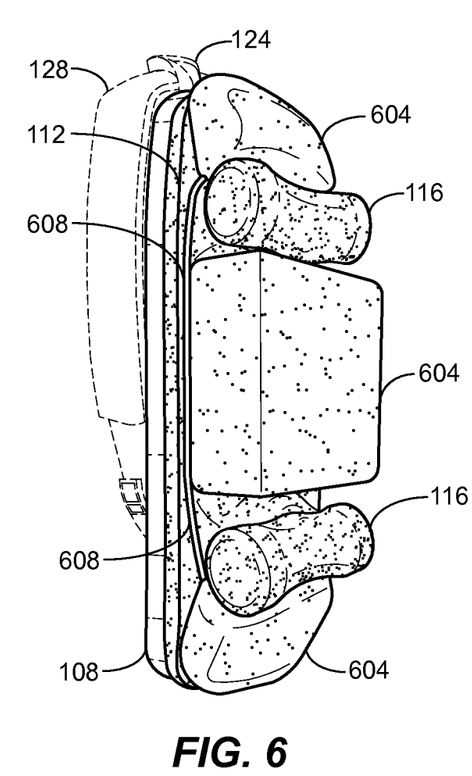
FIG. 6 is a front perspective view of an exemplary skateboard carrier bag with formfitting skateboard compartment having accessory compartments.

FIG. 6 illustrates accessory compartments 604 or bags that may be provided with the skateboard backpack 104 for storage of various items. Such compartments 604 may have their own zippers or other fasteners to secure items therein. As can be seen, the accessory compartments 604 may be at the front section 112 of the skateboard backpack 104, and may be positioned adjacent the pouches 116 which accept the trucks and wheels of a skateboard. Though shown with three accessory compartment 604, it is noted that the skateboard backpack 104 may comprise fewer or additional accessory compartments.

In one or more embodiments, the accessory compartments 604 may be affixed at the front section 112 of the skateboard backpack 104. Alternatively, the accessory compartments 604 may be attached by removable fasteners so as to be removable from the skateboard backpack 104. Removable accessory compartments 604 may be removably attached in various ways. Referring to FIG. 4 for example, the front section 112 may have one or more hook and loop or other fasteners 408 (e.g., Velcro™) that mate with corresponding fasteners on the accessory compartments 604.

Alternatively or in addition, the accessory compartments 604 may be removably attached by a friction fit. For example, as shown in FIG. 6, the accessory compartments 604 are joined together by connecting cords 608, which press the accessory compartments against the wheels of a skateboard, thus securing the accessory compartments in place. In some configurations, a connecting cord 608 may be configured to wrap around the wheels of a skateboard to hold an accessory compartment 604 in place. It is noted that a connecting cord 608 may be an elastic or other resilient material. In addition, straps, pieces of fabric, or the like may be used in place of a connecting cord 608 in some embodiments.

Figure 7:
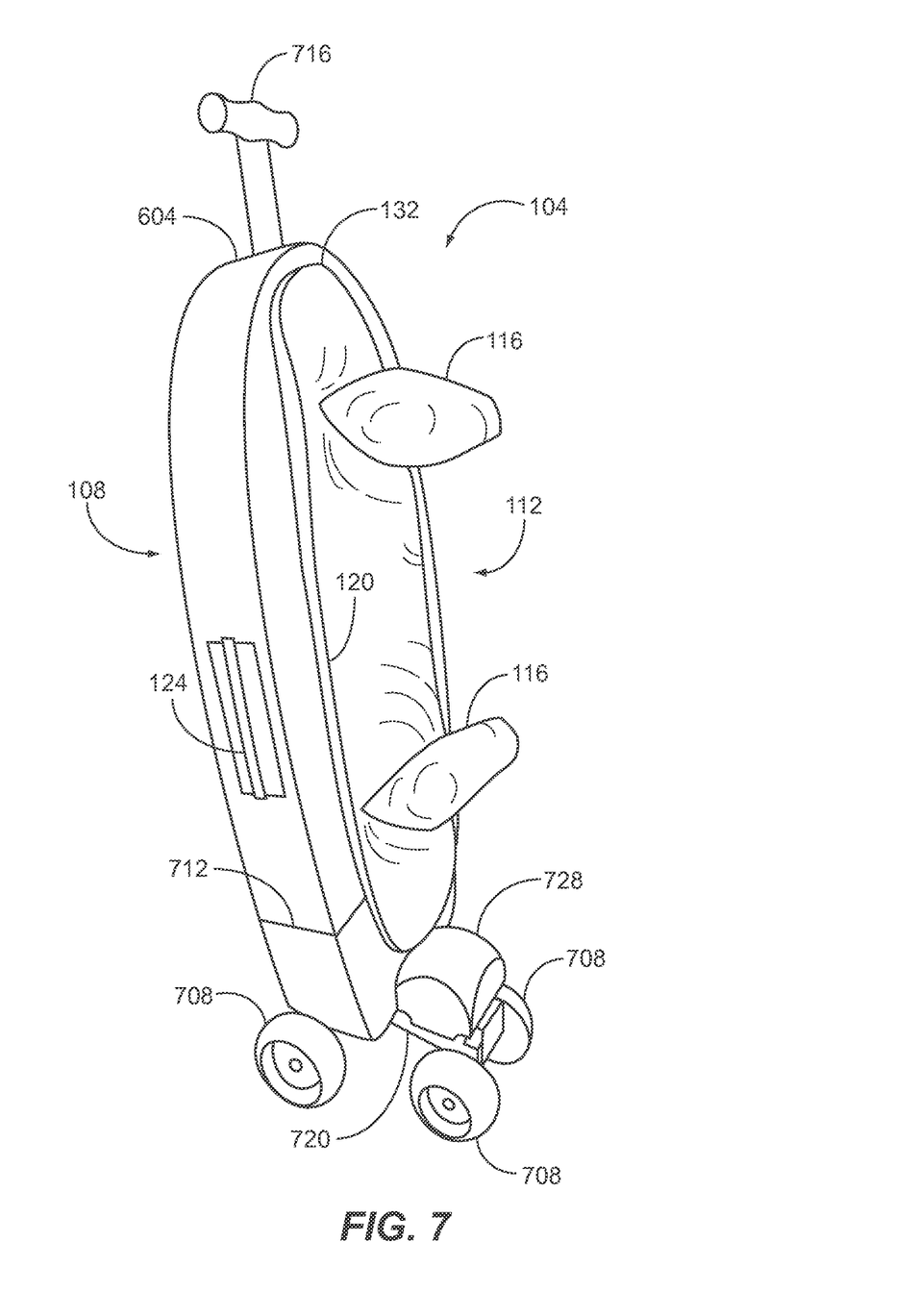
FIG. 7 is a front perspective view of an exemplary skateboard carrier bag.

FIG. 7 illustrates another embodiment of the skateboard carrier bag 104. As can be seen, the skateboard carrier bag 104 may also be constructed in wheeled or rolling embodiments. In such embodiments, a skateboard carrier bag 104 may comprise one or more wheels 708 that support the weight of the skateboard carrier bag while allowing the skateboard carrier bag to be mobile. One or more pull or other handles 716 may be provided to aid in grasping the skateboard carrier bag 104. A pull handle 716 may be retractable in one or more embodiments. It is contemplated that one or more carrier handles 124 may also be provided to aid in moving the skateboard carrier bag 104 as well.

As disclosed above, a skateboard carrier bag 104 will typically include a formfitting compartment 132 at its front end 112. A formfitting compartment 132 itself will typically comprise one or more pouches 116 to receive the wheels, trucks, or both of a skateboard. A formfitting compartment 132 may also comprise one or more zippers or other fasteners 120 that allow the formfitting compartment to be opened to receive or remove a skateboard, such as disclosed above. Various resilient or non-resilient fabrics may be used to form a formfitting compartment 132. In addition, the formfitting compartment 132 may be reinforced or lined as desired, such as disclosed above.

One or more accessory compartments 604 may be a back end 108 of the skateboard carrier bag 104. An accessory compartment 604 may be rigid or flexible and have various sizes and shapes. With reference to FIG. 7, a rigid accessory compartment 604 is shown with a formfitting compartment 132 attached thereto at the front end 112 of the skateboard carrier bag 104. It is contemplated that one or more section of an accessory compartment 604 may be reinforced with an additional layer of material, a coating or other reinforcement 712.

It is contemplated that only a portion of the accessory compartment 604 may be rigid. For example, only the portion to which a formfitting compartment 132 is attached may be formed from rigid material. This provides structure to support the formfitting compartment 132 while allowing the remainder of the accessory compartment 604 to be flexible, which may be advantageous when loading items into the accessory compartment. Alternatively, it is noted that a portion of the formfitting compartment 132, such as the surface that mates with the accessory compartment 604, may be rigid.

Rigidity may be achieved in various ways. For example, an accessory compartment 604 (or formfitting compartment 132) may be formed from rigid material. Some exemplary rigid materials include plastic, wood, metal, and various composite materials. As another example, rigidity may be achieved by constructing an accessory compartment 604 (or formfitting compartment 132) with a rigid frame. One or more fabrics or the like may then wrap or form a skin of the compartment.

Figure 8:
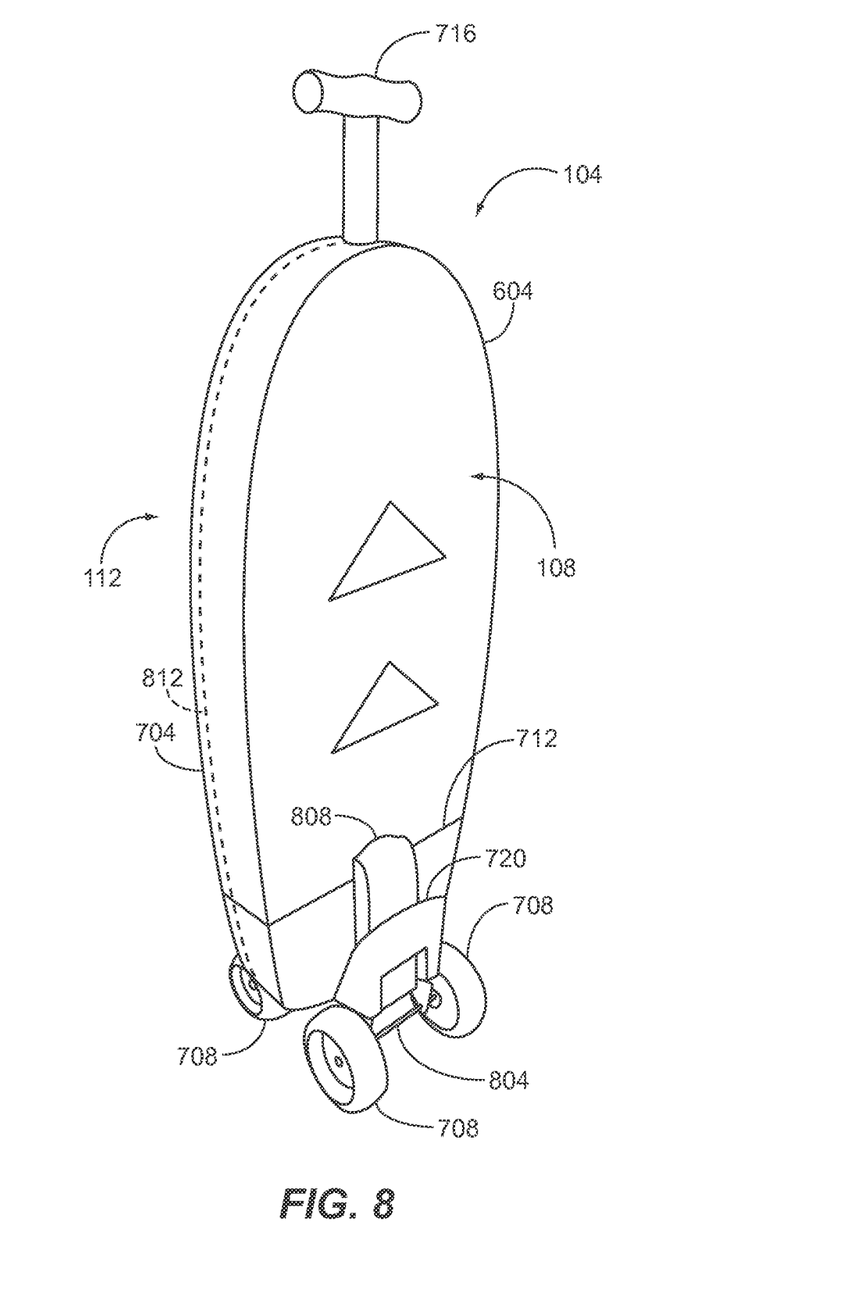
FIG. 8 is a back perspective view of an exemplary skateboard carrier bag.

An accessory compartment 604 may open in various ways. Referring to FIG. 8 for instance, an accessory compartment 604 may comprise a flap or other cover 704 that can be opened or removed to open the compartment. One or more fasteners 812, such as one or more zippers, buttons, hook and loop fasteners, or the like may be used to secure the cover 704.

In addition, one or more additional accessory compartments 604 may be part of a single skateboard carrier bag 104, such as described above. Additional accessory compartments 604 may be removably or permanently affixed to a skateboard carrier bag 104. For example, an accessory compartment 604 may be sewn, adhered or otherwise attached to a skateboard carrier bag 104. Alternatively or in addition, one or more connecting cords, fasteners or the like may be used to removably attach an accessory compartment 604, such as to a formfitting compartment 132 as disclosed above.

Referring now to FIGS. 7-8, it can be seen that a base 720 may be provided to support one or more wheels 708 of the skateboard carrier bag 104. A base 720 will typically be a rigid structure that is attached to an accessory compartment 604, a formfitting compartment 132 or both. Though shown with four wheels 708, it is contemplated that a base 720 may have one or more wheels 708. The skateboard carrier bag 104 may be tilted when rolled, such that one or more wheels 708 are supporting the skateboard carrier bag as it is moved. A wheel 708 may be attached to a base 720 in various ways. For example, a wheel 708 may be attached by one or more axels 804.

One or more reinforcement members 808 may be provided as well to increase rigidity, strengthen connections between elements of the skateboard carrier bag 104, or provide other reinforcement. It is noted that various portions of the base 720 may also have accessory compartments. For example, the base 720 illustrated in FIG. 7 comprises an accessory compartment 728 at the front end 112 of the skateboard carrier bag 104. This accessory compartment 728 may be opened by rotating or removing a flap or other cover.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A skateboard carrier bag comprising:
    an accessory compartment;
    a formfitting compartment comprising:
        a rigid planar back section;
        a front section formed from a resilient material;
        two reinforced pouches, wherein the two reinforced pouches protrude outward from the front section at opposite ends of the formfitting compartment and are formed from at least two layers of resilient material; and
        an opening for receiving a skateboard;
    a base; and
    one or more wheels attached to the base;
    wherein the accessory compartment is attached to an external surface of the rigid planar back section.

2. The skateboard carrier bag of claim 1 further comprising one or more additional accessory compartments.

3. The skateboard carrier bag of claim 1 further comprising one or more additional accessory compartments removably attached to the formfitting compartment by one or more connecting cords.

4. The skateboard carrier bag of claim 1, wherein the accessory compartment is rigid.

5. The skateboard carrier bag of claim 1, wherein the accessory compartment comprises a removable or rotatable cover.

6. The skateboard carrier bag of claim 1, wherein the formfitting compartment comprises one or more fasteners.

7. The skateboard carrier bag of claim 1 further comprising a pull handle attached to the accessory compartment.

8. A skateboard carrier comprising:
a base portion having one or more wheels;
an accessory compartment supported by the base portion; and
a formfitting compartment comprising:
a rigid planar back section;
a front section formed from a resilient material;
two pouches, wherein the two reinforced pouches protrude outward from the front section at opposite ends of the formfitting compartment and are formed from at least two layers of resilient material; and
one or more openings to receive a skateboard;
wherein the accessory compartment is attached to an external surface of the rigid planar back section.

9. The skateboard carrier of claim 8, wherein the one or more pouches are reinforced.

10. The skateboard carrier of claim 8 further comprising an additional accessory compartment at the base portion.

11. The skateboard carrier of claim 8 further comprising an additional accessory compartment removably attached to the formfitting compartment by one or more connecting cords.

12. The skateboard carrier of claim 8 further comprising one or more fasteners at the one or more openings of the formfitting compartment.

13. The skateboard carrier of claim 8, wherein the accessory compartment is rigid.

14. The skateboard carrier of claim 8, wherein the accessory compartment comprises a removable or rotatable cover.

15. A method for carrying a skateboard with a skateboard carrier bag comprising:
opening a formfitting compartment of the skateboard carrier bag, wherein the formfitting compartment comprises a rigid planar back section, a resilient front section, a first pouch and a second pouch, the first pouch and second pouch protruding outward from the resilient front section at opposite ends of the formfitting compartment and formed from at least two layers of resilient material;
placing the skateboard into the formfitting compartment, wherein one or more front wheels of the skateboard are received in the first pouch and one or more rear wheels of the skateboard are received in the second pouch; and
rolling the skateboard carrier bag on one or more wheels secured at a base of the skateboard carrier bag.

16. The method of claim 15, wherein the one or more pouches are reinforced.

17. The method of claim 15 further comprising closing the formfitting compartment and securing the formfitting compartment such that it remains closed with one or more fasteners.

18. The method of claim 15 further comprising attaching one or more additional accessory compartments to the formfitting compartment with one or more connecting cords.

19. The method of claim 15 further comprising storing one or more items in the accessory compartment.

20. The method of claim 15, wherein the accessory compartment is rigid.

* * * * *